US009543854B2

(12) United States Patent
Luo et al.

(10) Patent No.: US 9,543,854 B2
(45) Date of Patent: Jan. 10, 2017

(54) SOLAR PHOTOVOLTAIC THREE-PHASE MICRO-INVERTER SYSTEM AND A METHOD FOR IMPROVING THE CONVERSION EFFICIENCY THEREOF

(71) Applicant: Altenergy Power System, Inc., Zhejiang (CN)

(72) Inventors: Yuhao Luo, Zhejiang (CN); Dongming Zhou, Zhejiang (CN)

(73) Assignee: ALTENERGY POWER SYSTEM, INC., Zhejiang (CN)

( * ) Notice: Subject to any disclaimer, the term of this patent is extended or adjusted under 35 U.S.C. 154(b) by 492 days.

(21) Appl. No.: 14/160,478

(22) Filed: Jan. 21, 2014

(65) Prior Publication Data

US 2014/0132076 A1    May 15, 2014

Related U.S. Application Data

(63) Continuation of application No. PCT/CN2012/076368, filed on Jun. 1, 2012.

(30) Foreign Application Priority Data

Jul. 18, 2011    (CN) .......................... 2011 1 0201198

(51) Int. Cl.
*H02M 7/42* (2006.01)
*H02M 7/493* (2007.01)
(Continued)

(52) U.S. Cl.
CPC ............... *H02M 7/42* (2013.01); *H02M 7/493* (2013.01); *H02J 3/26* (2013.01);
(Continued)

(58) Field of Classification Search
USPC ........................................................ 307/82
See application file for complete search history.

(56) References Cited

U.S. PATENT DOCUMENTS

2011/0012430 A1*  1/2011  Cheng .............. H01L 31/02021
                                                          307/82

FOREIGN PATENT DOCUMENTS

CN              1954484 A       4/2007
CN           2018398015 U       5/2011
(Continued)

OTHER PUBLICATIONS

The International Search Report from PCT/CN2012/076368, dated Sep. 13, 2012. *English Translation version only*.

*Primary Examiner* — Joseph Chang
(74) *Attorney, Agent, or Firm* — Kilpatrick Townsend & Stockton LLP

(57) ABSTRACT

The invention provides a solar photovoltaic three-phase micro-inverter system comprising a plurality of three-phase micro-inverters. Every three of the three-phase micro-inverters form a group and are coupled to a three-phase AC power grid. Each of the three-phase micro-inverters comprises 3 single-phase inverter circuits, each of the single-phase inverter circuits comprises 2 conversion circuits, and each of the conversion circuits corresponds to one phase of the three-phase AC power grid. AC outputs of the same conversion circuits of the three micro-inverters in one group are coupled to three-phase live wires of the three-phase AC power grid respectively. Accordingly, the invention provides a method for improving conversion efficiency of the solar photovoltaic three-phase micro-inverter system.

8 Claims, 8 Drawing Sheets

(51) Int. Cl.
*H02M 1/00* (2006.01)
*H02J 3/26* (2006.01)

(52) U.S. Cl.
CPC ...... *H02M 2001/0032* (2013.01); *Y02B 70/16* (2013.01); *Y02E 10/56* (2013.01); *Y02E 40/50* (2013.01); *Y10T 307/707* (2015.04)

(56) References Cited

FOREIGN PATENT DOCUMENTS

| | | |
|---|---|---|
| CN | 102122897 A | 7/2011 |
| CN | 102255536 A | 11/2011 |
| CN | 202135071 U | 2/2012 |
| WO | 2010/091786 A2 | 8/2010 |

\* cited by examiner

SOLAR PHOTOVOLTAIC THREE-PHASE MICRO-INVERTER SYSTEM AND A METHOD FOR IMPROVING THE CONVERSION EFFICIENCY THEREOF

TECHNICAL FIELD

This invention relates to the field of solar photovoltaic technology, and more particularly, to a solar photovoltaic three-phase micro-inverter system and a method for improving the conversion efficiency thereof.

BACKGROUND ART

Recently solar photovoltaic systems tend to employ distributed micro inverters (micro-inverters). Micro-inverters may provide maximum power point control for each photovoltaic assembly, such that each assembly can generate maximum energy, thereby improving the performance of the photovoltaic system. The micro-inverters may also have alternating current (AC) low voltage outputs, rather than a direct current (DC) high voltage output from a centralized inverter system, so that security and efficiency can be improved.

FIG. 1 is a simplified internal block diagram of a three-phase micro-inverter in the prior art. As shown, a three-phase micro-inverter 101 includes three single-phase inverter circuits 102, three DC terminals and one three-phase AC terminal (not shown). The three-phase micro-inverter 101 is coupled with three independent solar photovoltaic assemblies 103 via the DC terminals, and couples the three single-phase inverter circuits 102 to a three-phase AC cable via the three-phase AC terminal, with each single-phase inverter circuit 102 being coupled to one phase of a commercial three-phase AC power grid 104.

In FIG. 1, the three single-phase inverter circuits 102 in the above three-phase micro-inverter 101 are typically identical. Each single-phase inverter circuit 102 has one DC input, such that each three-phase micro-inverter 101 is coupled to three solar photovoltaic assemblies 103 via three DC terminals. Each single-phase inverter circuit 102 also has one single-phase AC output, and is coupled to the neutral wire N and one of the live wires L1, L2, or L3 of the three-phase AC power grid 104. As such, the three single-phase inverter circuits 102 are coupled to live wire L1/neutral wire N, live wire L2/neutral wire N, and live wire L3/neutral wire N of one three-phase AC power grid 104, respectively. Each three-phase micro-inverter 101 is coupled to the three-phase AC power grid 104 via the three-phase AC terminal. As described above, each single-phase inverter circuit 102 converts the AC current generated by a connected solar photovoltaic assembly 103 into a single-phase AC current. Since the single-phase inverter circuits 102 are coupled to the three phases of the three-phase AC power grid 104 respectively, the single-phase inverter circuits 102 generate AC currents with phases matching those of the voltages of the three-phase AC power grid 204.

FIG. 2 is a simplified schematic diagram of a three-phase micro-inverter coupled to a three-phase AC power grid in the prior art. As shown, each three-phase micro-inverter 101 is coupled to the three-phase AC power grid 104 in the same way, and the AC outputs A, B, C of each three-phase micro-inverter 101 are coupled to the live wires L1, L2, and L3 of the three-phase AC power grid 104, respectively.

FIG. 3 is a simplified flowchart diagram illustrating how a three-phase micro-inverter turns off a conversion circuit to improve the conversion efficiency in the prior art. Each three-phase micro-inverter 101 includes three single-phase inverter circuits 102, wherein each single-phase inverter circuit 102 includes two interlaced parallel conversion circuits A1, A2, B1, B2, C1 and C2. As such, each three-phase micro-inverter 101 includes six conversion circuits A1, A2, B1, B2, C1 and C2. Each single-phase inverter circuit 102 has its two conversion circuits operate when the power is high, and turns off one of the two conversion circuits when the power is low, in which case only one conversion circuit functions. For example, a three-phase micro-inverter 101 may have a full power of 200 W, and one conversion circuit is turned off when the operating power is lower than 100 W, thus only one conversion circuit functions, thereby reducing the loss.

FIG. 4 is a simplified schematic diagram of a three-phase micro-inverter which turns off one conversion circuit to reduce loss in the prior art. As shown, each three-phase micro-inverter 101 is coupled to the three-phase AC power grid 104 in the same way. If a three-phase micro-inverter system consists of a group of 3 three-phase micro-inverters 101, the full power P0 for this three-phase micro-inverter system is 600 W. When the system has an operating power less than P0/2, i.e., 300 W, the 3 single-phase inverter circuits 102 each have to turn off one conversion circuit at the same time, e.g., A2, B2, and C2, in order to reach balance among the three phases of the power grid 104. That is, each three-phase micro-inverter 101 has to turn off three conversion circuits in total. Consequently, when the system has an operating power of 300 W, the power ratio is 50%, and the efficiency is equivalent to a single-phase inverter that has an operating power of 100 W. At an even lower power, the efficiency of the three single-phase inverter circuits 102 will decrease similarly as a single-phase inverter circuit 102 with one conversion circuit in operation.

In fact, the operation efficiency of a three-phase micro-inverter varies with the input power, and especially, it drops quickly at low power. For a solar photovoltaic system, the inverters will operate in a low power state for a long duration, due to the environment characteristics. Then, there is a need to simply improve the conversion efficiency of a solar photovoltaic three-phase micro-inverter system while operating in low power.

SUMMARY

This invention intends to solve the technical problem of providing a solar photovoltaic three-phase micro-inverter system and a method for improving the conversion efficiency thereof, thus simply improving the conversion efficiency thereof when it is operating in low power.

To solve the technical problem above, this invention provides a solar photovoltaic three-phase micro-inverter system, comprising a plurality of three-phase micro-inverters, wherein every three of the three-phase micro-inverters form a group and are coupled to a three-phase AC power grid;

wherein each of the three-phase micro-inverters comprises 3 single-phase inverter circuits, each of the single-phase inverter circuits comprises 2 conversion circuits, and each of the conversion circuits corresponds to one phase of the three-phase AC power grid;

wherein AC outputs of the same conversion circuits of the three micro-inverters in one group are coupled to three-phase live wires of the three-phase AC power grid, respectively.

Optionally, the conversion circuits are interlaced parallel.

Optionally, the three-phase micro-inverter further comprises three DC terminals, and the three-phase micro-inverter is coupled to three independent solar photovoltaic assemblies via the DC terminals.

Optionally, the three-phase micro-inverter further comprises a three-phase AC terminal, and the three-phase micro-inverter is coupled to the three-phase AC power grid via the three-phase AC terminal.

Optionally, the three-phase micro-inverters are distributed micro-inverters.

Accordingly, this invention provides a method for improving conversion efficiency of the solar photovoltaic three-phase micro-inverter system as described above, comprising the steps of:

calculating a power sum of a group of three-phase micro-inverters;

determining whether the power sum is less than 5/6 of a full power of the three-phase micro-inverters;

if the power sum is less than 5/6 of the full power, generating a control signal to turn off one same conversion circuit in each of the three-phase micro-inverters, otherwise ending the method;

determining whether the power sum is less than 4/6 of the full power of the three-phase micro-inverters;

if the power sum is less than 4/6 of the full power, generating a control signal to further turn off one same conversion circuit in each of the three-phase micro-inverters, otherwise ending the method;

determining whether the power sum is less than 3/6 of the full power of the three-phase micro-inverters;

if the power sum is less than 3/6 of the full power, generating a control signal to further turn off one same conversion circuit in each of the three-phase micro-inverters, otherwise ending the method;

determining whether the power sum is less than 2/6 of the full power of the three-phase micro-inverters;

if the power sum is less than 2/6 of the full power, generating a control signal to further turn off one same conversion circuit in each of the three-phase micro-inverters, otherwise ending the method;

determining whether the power sum is less than 1/6 of the full power of the three-phase micro-inverters; and if the power sum is less than 1/6 of the full power, generating a control signal to further turn off one same conversion circuit in each of the three-phase micro-inverters, otherwise ending the method.

Optionally, the conversion circuits are interlaced parallel.

Optionally, the three-phase micro-inverters are distributed micro-inverters.

As compared with the prior art, the invention has the following advantages:

In this invention, 3 three-phase micro-inverters are designated as a group, each three-phase micro-inverter including 3 single-phase inverter circuits, and each single-phase inverter circuit in turn including two interlaced parallel conversion circuits. The AC outputs of a group of three-phase micro-inverters are coupled interlacedly to the live wires L1, L2, and L3 of a three-phase AC power grid respectively. Consequently, the same conversion circuit in each of the three-phase micro-inverters in the same group corresponds to a respective one of the three phases L1, L2, and L3, and the same conversion circuits in the 3 three-phase micro-inverters of the same group are coupled to the three phases of the power grid, respectively. As such, when the power sum drops from full loading, each three-phase inverter may turn off the same single conversion circuit successively, so as to improve the conversion efficiency.

As compared with the three-phase micro-inverter system in the prior art which has a full efficiency in case of above 50% power and the efficiency decreases in case of below 50% power, the three-phase micro-inverter system in this invention has a full efficiency in case of above 16.7% power and the efficiency decreases much slower in case of below 16.7% power. As a result, this invention simply improves the conversion efficiency of the three-phase micro-inverter system while operating in low power.

DESCRIPTION OF FIGURES

The above and other features, properties and advantages of the invention will be more apparent from the following description made in conjunction with the drawings and embodiments, wherein.

DETAILED DESCRIPTION

The invention will be further described below in conjunction with the specific embodiments and the drawings. More details are set forth in the following description for better understanding of the invention, although it is apparent that the invention may be embodied in various manners other than that described herein. Those skilled in the art may make extension and deduction depending on the practical application situations without departing from the spirit of the invention. Thus, the scope of the invention is not intended to be limited by the contents of the specific embodiments.

Figure 1:
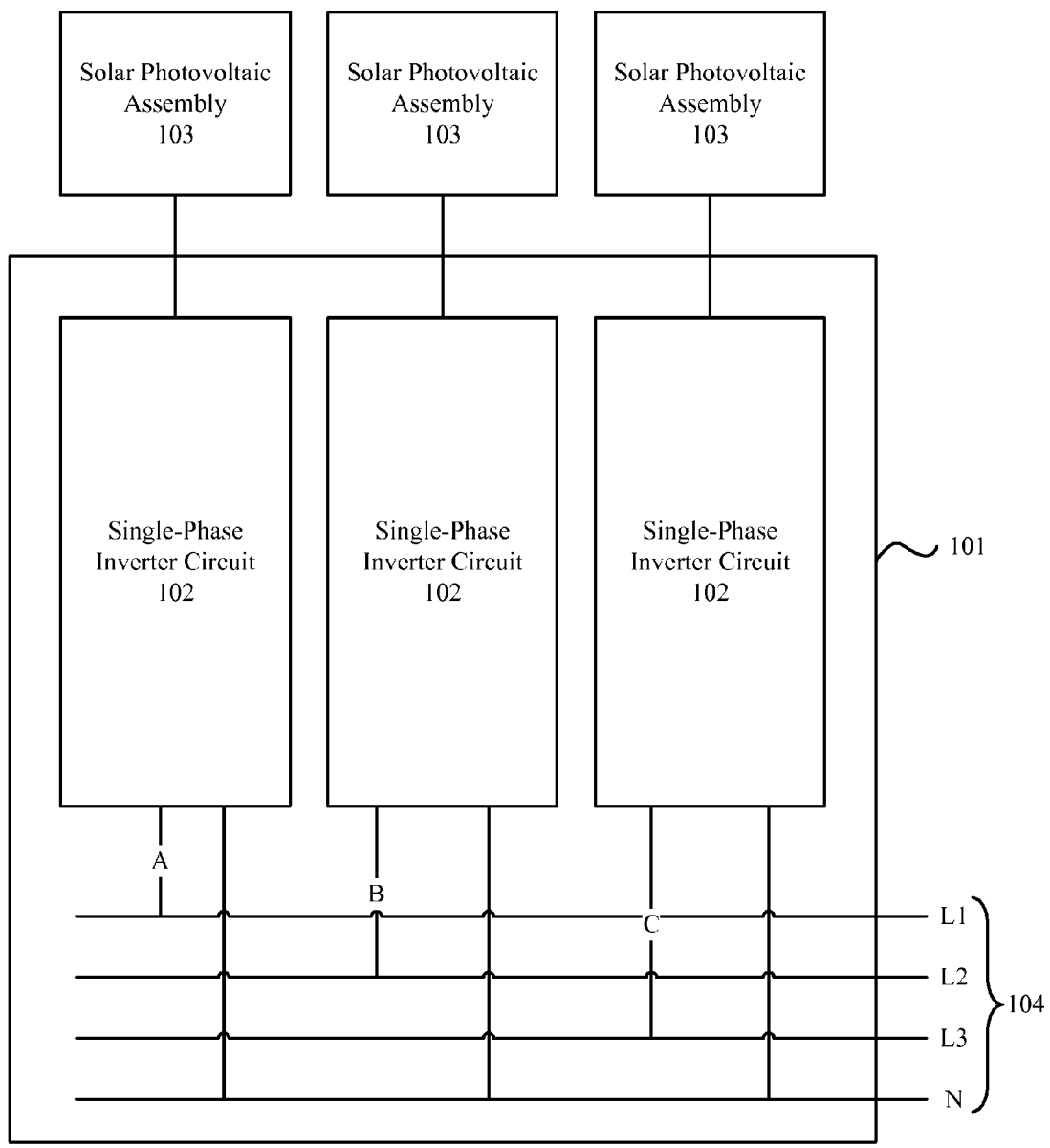
FIG. 1 is a simplified internal block diagram of a three-phase micro-inverter in the prior art.
Figure 2:
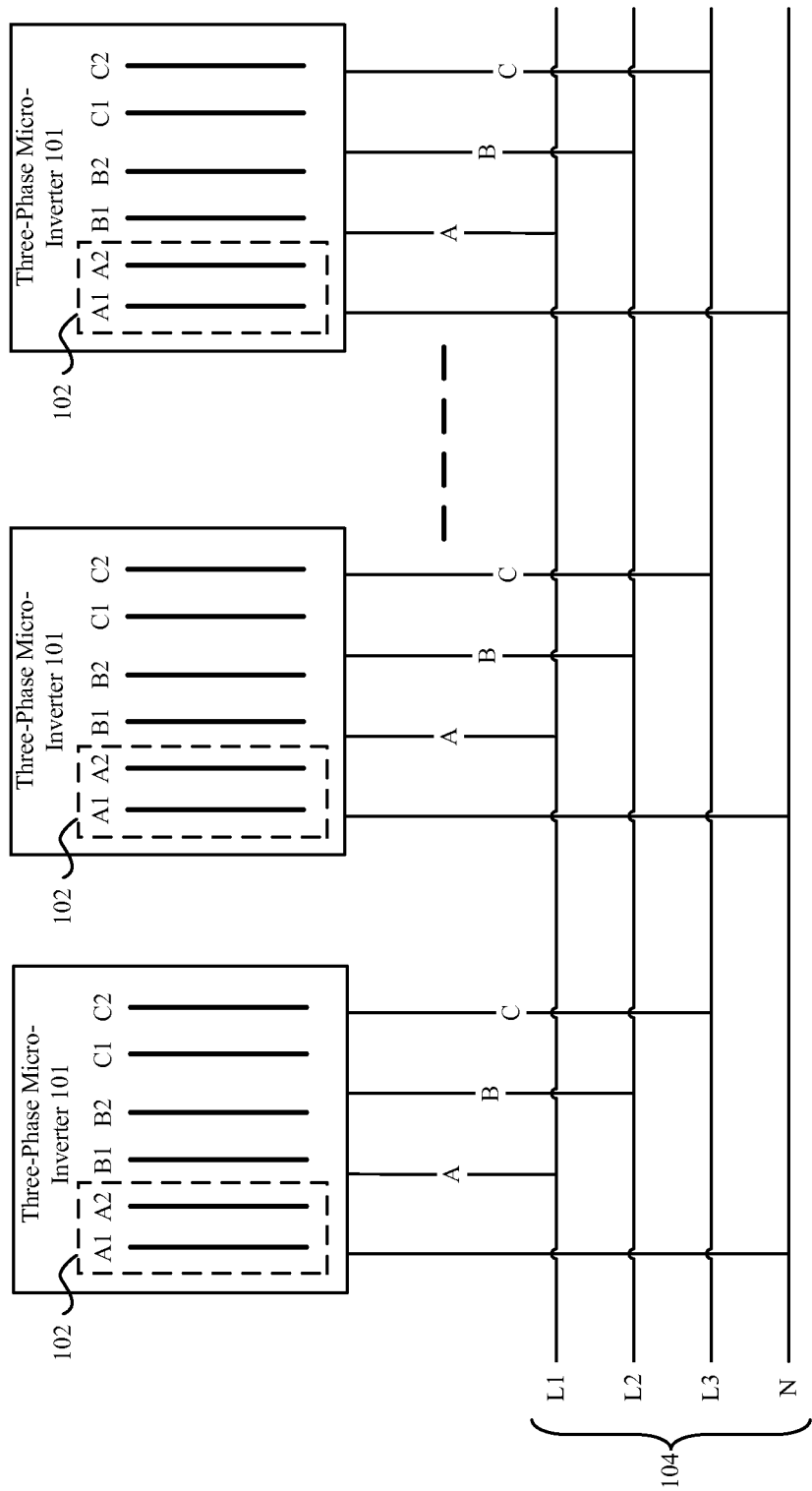
FIG. 2 is a simplified schematic diagram of a three-phase micro-inverter coupled to a three-phase AC power grid in the prior art.
Figure 3:
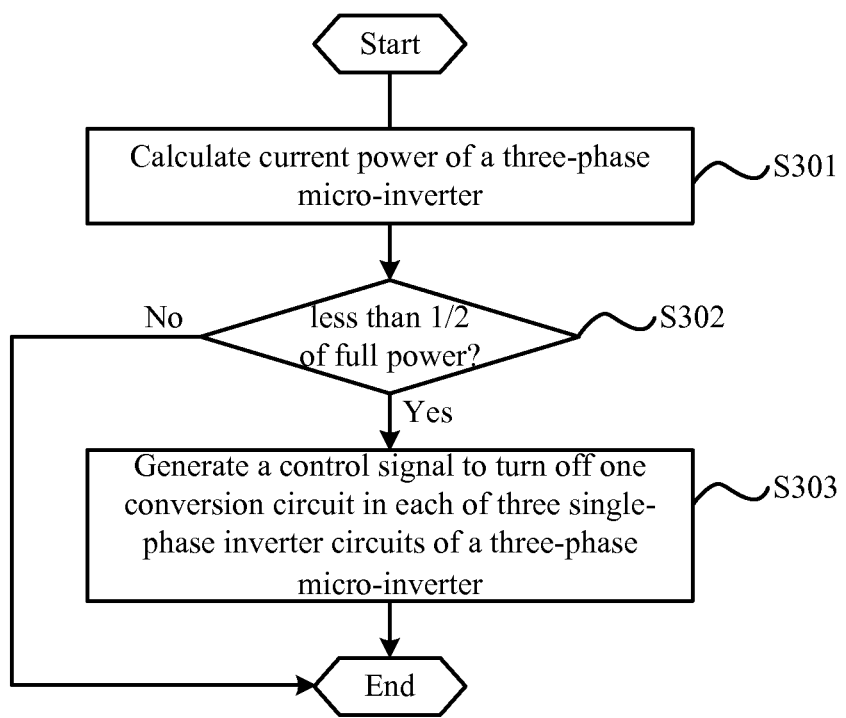
FIG. 3 is a simplified flowchart diagram illustrating how a three-phase micro-inverter turns off a conversion circuit to improve the conversion efficiency in the prior art.
Figure 4:
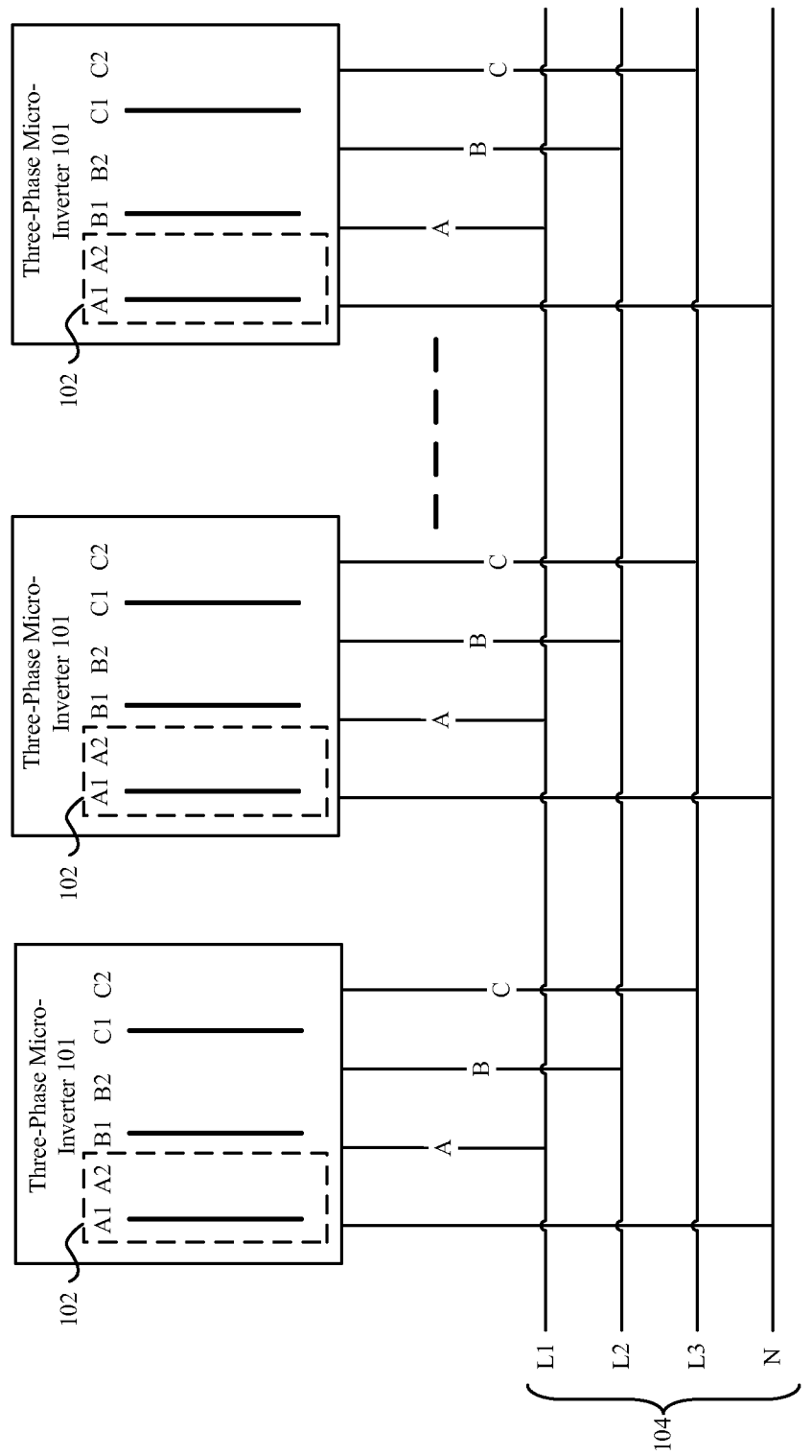
FIG. 4 is a simplified schematic diagram of a three-phase micro-inverter which turns off one conversion circuit to reduce loss in the prior art.
Figure 5:
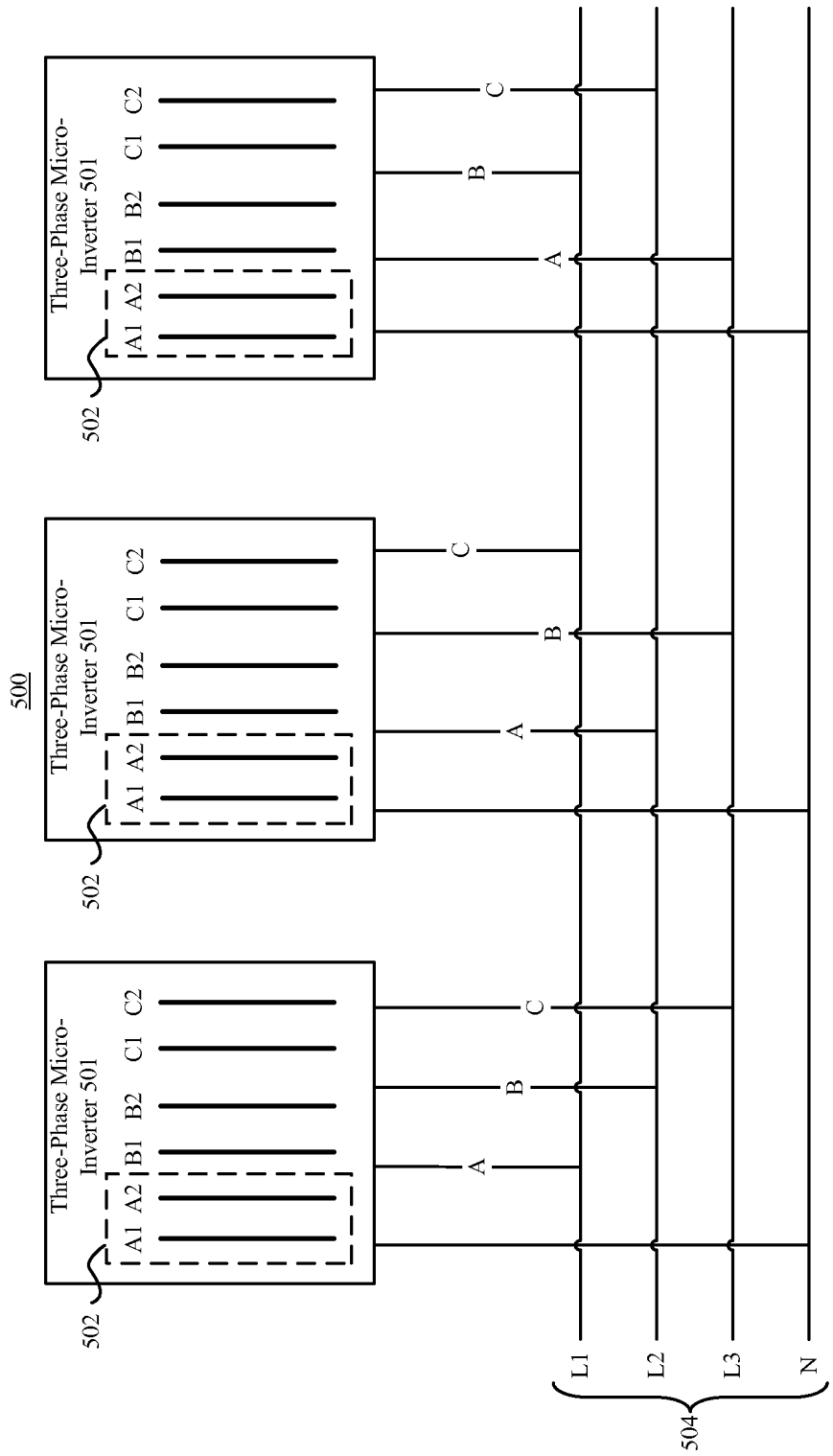
FIG. 5 is a simplified schematic diagram of a solar photovoltaic three-phase micro-inverter system in an embodiment of the invention.

FIG. 5 is a simplified schematic diagram of a solar photovoltaic three-phase micro-inverter system in an embodiment of the invention. As shown, the solar photovoltaic three-phase micro-inverter system 500 includes a plurality of three-phase micro-inverters 501, which may be distributed micro-inverters. A group of every 3 three-phase micro-inverters 501 are coupled to three independent solar photovoltaic assemblies (not shown) via three DC terminals (not shown) respectively, and are coupled to a three-phase AC power grid 504 via a three-phase AC terminal. Each three-phase micro-inverter 501 includes 3 single-phase inverter circuits 502, wherein each single-phase inverter circuit 502 in turn includes two interlaced parallel conversion circuits A1, A2; B1, B2; or C1, C2. As shown, three AC outputs A of the 3 three-phase micro-inverters 501 each are coupled to a respective one of the live wire L1, L2, and L3 of the three-phase AC power grid 504. Similarly, the AC outputs B and C each are coupled to a respective one of the live wire L1, L2, and L3 of the three-phase AC power grid 504. As such, each conversion circuit A1, A2; B1, B2; C1, C2 in the solar photovoltaic three-phase micro-inverter system 500 corresponds to one phase L1, L2, or L3 of the three-phase AC power grid 504. The AC outputs of the same conversion circuits A1, A2, B1, B2, C1, or C2 in the 3 micro-inverters 501 in one group are coupled to the three-phase live wires L1, L2, and L3 of the three-phase AC power grid 504, respectively. For example, the conversion circuit C2 of the leftmost three-phase micro-inverter 501 as shown is coupled to the live wire L3, the conversion circuit C2 of the middle three-phase micro-inverter 501 is coupled to the live wire L1, and the conversion circuit C2 of the rightmost three-phase micro-inverter 501 is coupled to the live wire L2.

Figure 6:
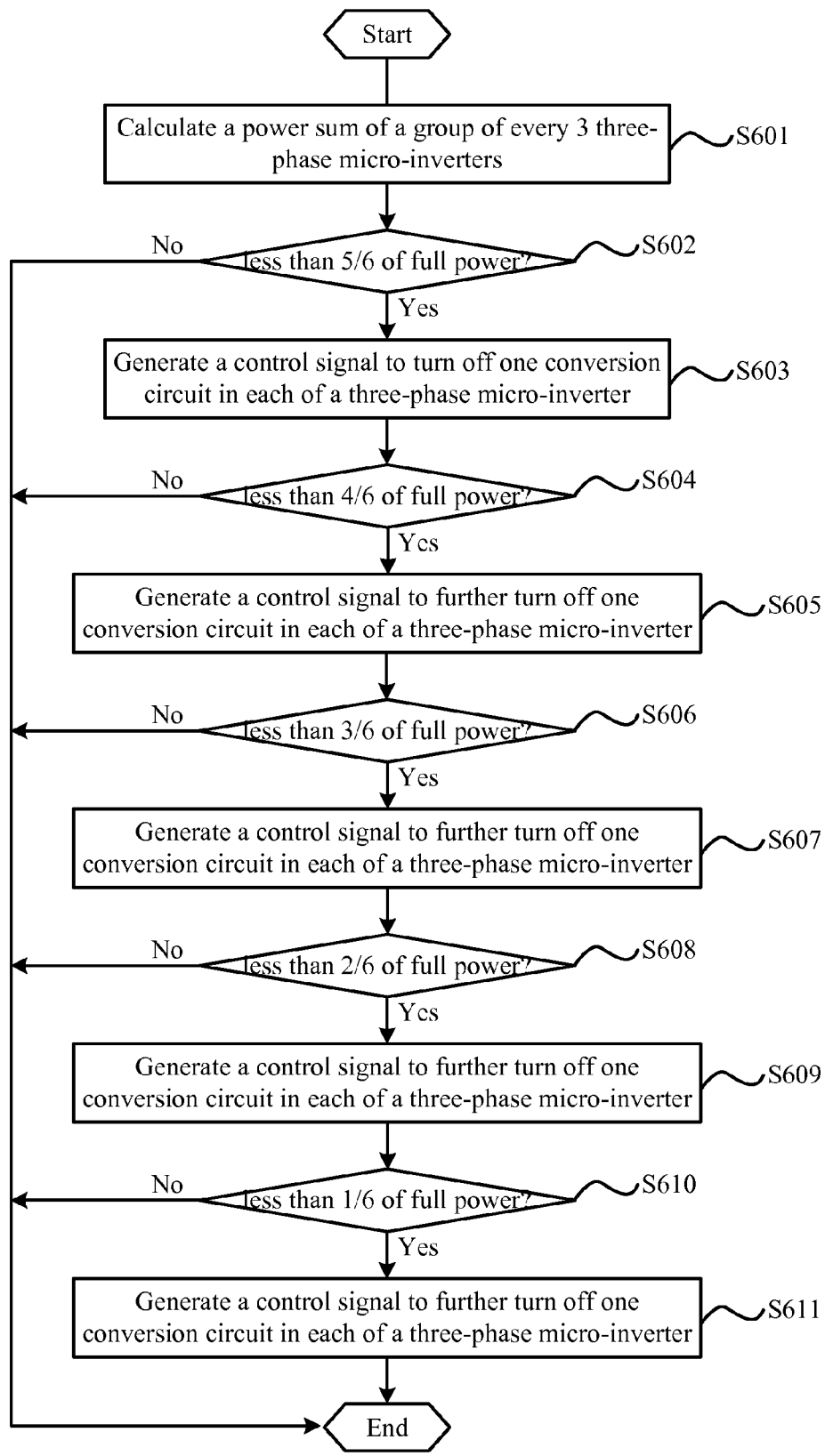
FIG. 6 is a flowchart schematic diagram of a method for improving the conversion efficiency of a solar photovoltaic three-phase micro-inverter system in an embodiment of the invention.

FIG. 6 is a flowchart schematic diagram of a method for improving the conversion efficiency of the above solar photovoltaic three-phase micro-inverter system in an embodiment of the invention. The solar photovoltaic three-phase micro-inverter system may be the solar photovoltaic three-phase micro-inverter system in an embodiment of the invention as shown in FIG. 5. In the solar photovoltaic three-phase micro-inverter system 501, the three-phase micro-inverters 501 may be distributed micro-inverters. The conversion circuits A1, A2; B1, B2; and C1, C2 in various single-phase inverter circuits 502 may be interlaced in parallel.

As shown in FIG. 6, the method flow may include:

Performing step S601, where a power sum of a group of every 3 three-phase micro-inverters in the system is calculated;

Performing step S602, where it is determined whether the power sum is less than 5/6 of a full power of the three-phase micro-inverters;

Performing step S603, where if the power sum is less than 5/6 of the full power, a control signal is generated to turn off one same conversion circuit in each of the three-phase micro-inverters, otherwise the method ends;

Performing step S604, where it is determined whether the power sum is less than 4/6 of the full power of the three-phase micro-inverters;

Performing step S605, where if the power sum is less than 4/6 of the full power, a control signal is generated to further turn off one same conversion circuit in each of the three-phase micro-inverters, otherwise the method ends;

Performing step S606, where it is determined whether the power sum is less than 3/6 of the full power of the three-phase micro-inverters;

Performing step S607, where if the power sum is less than 3/6 of the full power, a control signal is generated to further turn off one same conversion circuit in each of the three-phase micro-inverters, otherwise the method ends;

Performing step S608, where it is determined whether the power sum is less than 2/6 of the full power of the three-phase micro-inverters;

Performing step S609, where if the power sum is less than 2/6 of the full power, a control signal is generated to further turn off one same conversion circuit in each of the three-phase micro-inverters, otherwise the method ends;

Performing step S610, where it is determined whether the power sum is less than 1/6 of the full power of the three-phase micro-inverters;

Performing step S611, where if the power sum is less than 1/6 of the full power, a control signal is generated to further turn off one same conversion circuit in each of the three-phase micro-inverters, otherwise the method ends.

As can be seen, as the power sum of the solar photovoltaic three-phase micro-inverter system decreases, the same single conversion circuit in each three-phase micro-inverter may be turned off successively. If the power sum is less than 5P0/6 (where P0 is the total or full power of the solar photovoltaic three-phase micro-inverter system), all the conversion circuits C2 may be turned off; if the power sum is less than 4P0/6, all the conversion circuits C1 may be turned off; if the power sum is less than 3P0/6, all the conversion circuits B2 may be turned off; if the power sum is less than 2P0/6, all the conversion circuits B1 may be turned off; and if the power sum is less than P0/6, all the conversion circuits A2 may be turned off. It results the situation as shown in FIG. 7.

Figure 7:
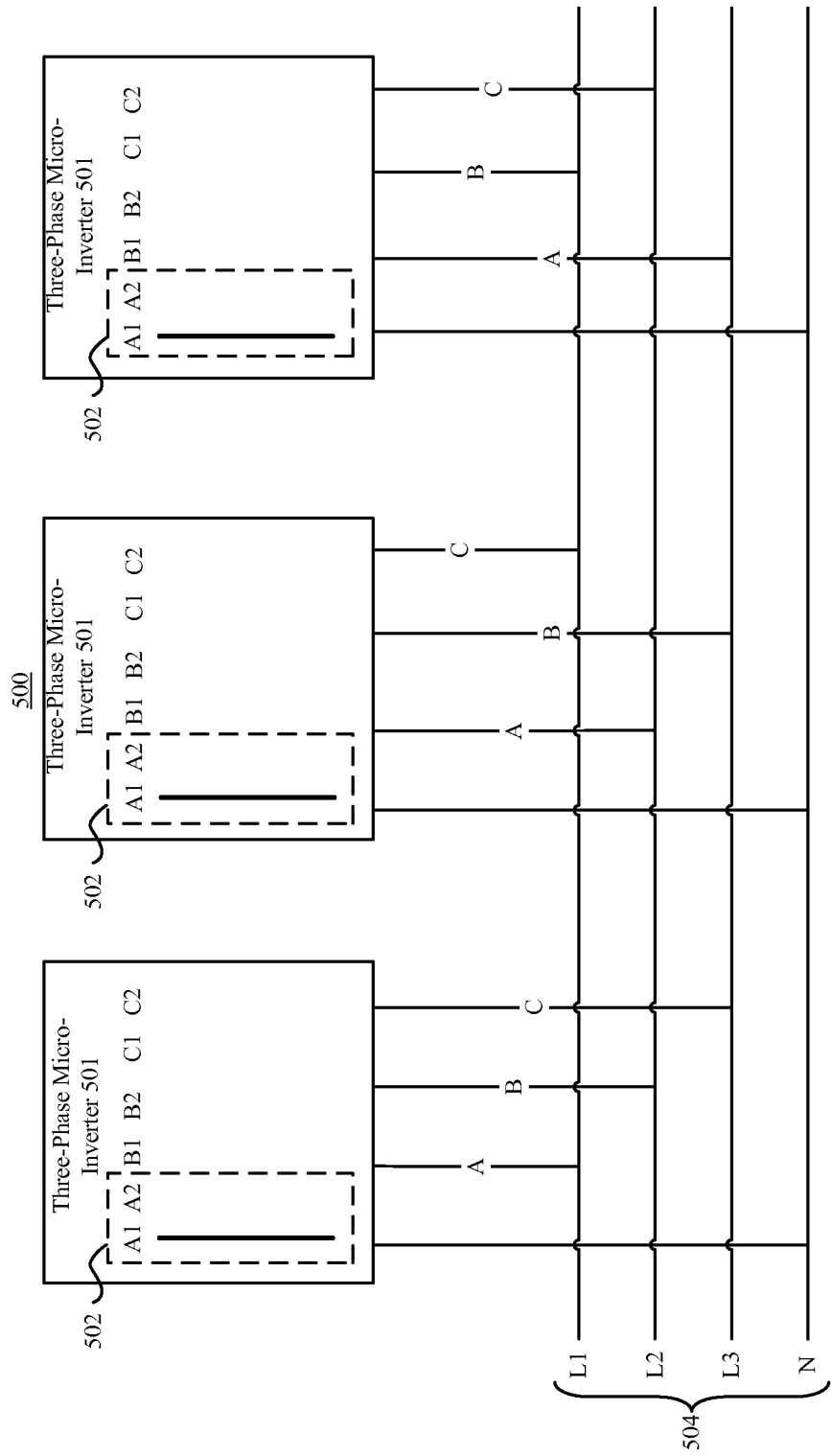
FIG. 7 is a simplified schematic diagram of a three-phase micro-inverter, 5 conversion circuits of which are turned off successively to improve the conversion efficiency in an embodiment of the invention.

FIG. 7 is a simplified schematic diagram of a three-phase micro-inverter, 5 conversion circuits of which are turned off successively to improve the conversion efficiency in an embodiment of the invention. As shown, for this invention, when only the conversion circuit A1 of each three-phase micro-inverter 501 remains in operation, the power of the three-phase micro-inverter 501 drops from e.g., 600 W to 100 W. Then, it operates similarly as a single conversion circuit of a single-phase inverter circuit, and similarly as a three-phase micro-inverter 101 that turns off three conversion circuits in the prior art. That is, when the power is 100 W/600 W=16.7%, the efficiency of this invention is the same as that in the prior art with a power of 50%.

The table below compares the conversion efficiency versus power ratio for a solar photovoltaic three-phase micro-inverter system in an embodiment of the invention and a solar photovoltaic three-phase micro-inverter system in the prior art (for the sake of comparison, it is assumed here that the prior art and this invention each have a full power of 600 W):

|  | Prior Art | This Invention |  |
| --- | --- | --- | --- |
| Full power P0 | 600 | 600 |  |
| Power of One Conversion Circuit P1 | Power Ratio 3P1/P | Power Ratio P1/P | Conversion Efficiency |
| 100 | 50.0% | 16.7% | 1 |
| 50 | 25.0% | 8.3% | 0.99 |
| 30 | 15.0% | 5.0% | 0.95 |
| 20 | 10.0% | 3.3% | 0.9 |
| 10 | 5.0% | 1.7% | 0.8 |
| 5 | 2.5% | 0.8% | 0.7 |

Figure 8:
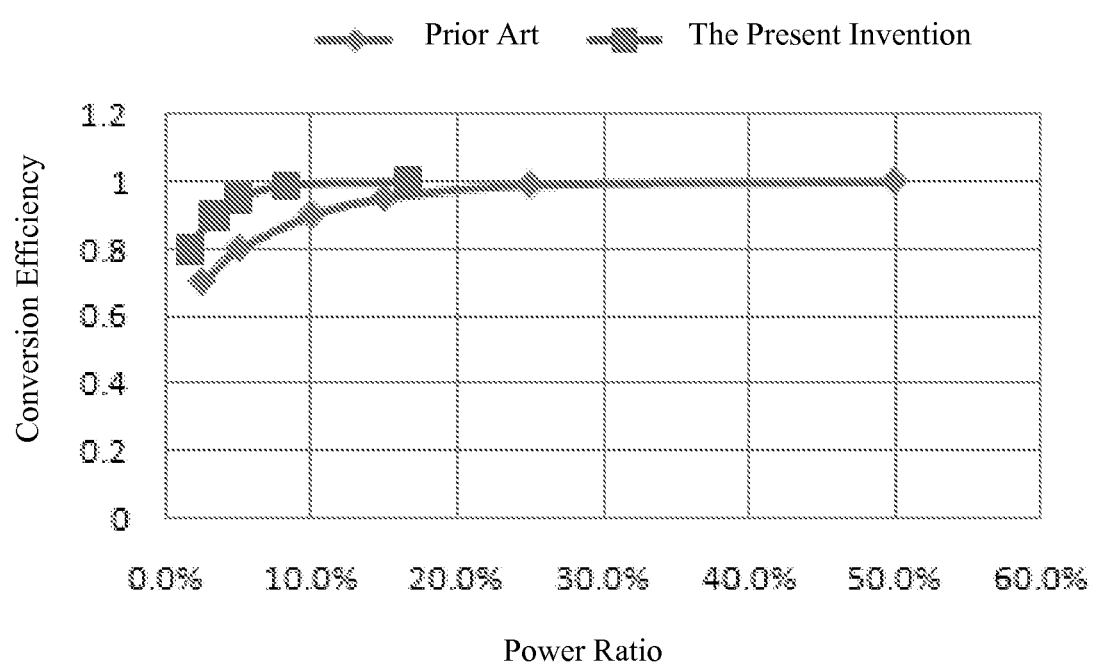
FIG. 8 is a graph illustrating the conversion efficiency versus power ratio for a solar photovoltaic three-phase micro-inverter system in an embodiment of the invention and a solar photovoltaic three-phase micro-inverter system in the prior art.

FIG. 8 is a graph illustrating the conversion efficiency versus power ratio for a solar photovoltaic three-phase micro-inverter system in an embodiment of the invention and a solar photovoltaic three-phase micro-inverter system in the prior art. For the reasons described above, the solar photovoltaic three-phase micro-inverter system in this invention significantly improves the conversion efficiency at low power.

For a three-phase micro-inverter system in the prior art, since one conversion circuit for each of the three phases is turned off simultaneously whenever one of the interlaced parallel conversion circuits has to be turned off, i.e., 3 out of 6 conversion circuits are turned off in total. Assuming a single conversion circuit has a power of P1, and the full power is P0, then the power ratio is 3P1/P0.

While for the three-phase micro-inverter system 500 in this invention, only 1 out of 6 conversion circuits for each of the three phases may be turned off each time, until only 1 conversion circuit is left. Assuming a single conversion circuit has a power of P1, and the full power is P0, then the power ratio is P1/P0.

Additionally, it should be noted that, in the above embodiments, two interlaced parallel conversion circuits are taken as examples, although multiple conversion circuits are possible in practice.

In this invention, 3 three-phase micro-inverters are designated as a group, each three-phase micro-inverter including 3 single-phase inverter circuits, and each single-phase inverter circuit in turn including two interlaced parallel conversion circuits. The AC outputs of a group of three-phase micro-inverters are coupled interlacedly to the live wires L1, L2, and L3 of a three-phase AC power grid respectively. Consequently, the same conversion circuit in each of the three-phase micro-inverters in the same group corresponds to a respective one of the three phases L1, L2, and L3, and the same conversion circuits in the 3 three-phase micro-inverters of the same group are coupled to the three phases of the power grid, respectively. As such, when the power sum drops from full loading, each three-phase inverter may turn off the same single conversion circuit successively, so as to improve the conversion efficiency.

As compared with the three-phase micro-inverter system in the prior art which has a full efficiency in case of above 50% power and the efficiency decreases in case of below 50% power, the three-phase micro-inverter system in this invention has a full efficiency in case of above 16.7% power and the efficiency decreases much more slowly in case of below 16.7% power. As a result, this invention simply improves the conversion efficiency of the three-phase micro-inverter system while operating in low power.

The invention has been disclosed above with preferred embodiments, which are not intended to limit the invention. Possible variations and modifications can be made by those skilled in the art without departing from the spirit and scope of the invention. Accordingly, any contents compliant with the technical solutions of this invention, any variations to the above embodiments made in accordance with the technical nature of this invention, the equivalents and modifications thereof fall within the scope of the invention as defined by the Claims.

The invention claimed is:

1. A solar photovoltaic three-phase micro-inverter system, comprising a plurality of three-phase micro-inverters, wherein every three of the three-phase micro-inverters form a group and are coupled to a three-phase AC power grid;
    wherein each of the three-phase micro-inverters comprises 3 single-phase inverter circuits, each of the single-phase inverter circuits comprises 2 conversion circuits, and each of the conversion circuits corresponds to one phase of the three-phase AC power grid;
    wherein AC outputs of same conversion circuits of the three micro-inverters in one group are coupled to three-phase live wires of the three-phase AC power grid, respectively.

2. The solar photovoltaic three-phase micro-inverter system of claim 1, wherein the conversion circuits are interlaced parallel.

3. The solar photovoltaic three-phase micro-inverter system of claim 1, wherein the three-phase micro-inverter further comprises three DC terminals, and the three-phase micro-inverter is coupled to three independent solar photovoltaic assemblies via the DC terminals.

4. The solar photovoltaic three-phase micro-inverter system of claim 3, wherein the three-phase micro-inverter further comprises a three-phase AC terminal, and the three-phase micro-inverter is coupled to the three-phase AC power grid via the three-phase AC terminal.

5. The solar photovoltaic three-phase micro-inverter system of claim 1, wherein the three-phase micro-inverters are distributed micro-inverters.

6. A method for improving conversion efficiency of the solar photovoltaic three-phase micro-inverter system of claim 1, comprising the steps of:
    calculating a power sum of a group of three-phase micro-inverters;
    determining whether the power sum is less than 5/6 of a full power of the three-phase micro-inverters;
    if the power sum is less than 5/6 of the full power, generating a control signal to turn off one same conversion circuit in each of the three-phase micro-inverters, otherwise ending the method;
    determining whether the power sum is less than 4/6 of the full power of the three-phase micro-inverters;
    if the power sum is less than 4/6 of the full power, generating a control signal to further turn off one same conversion circuit in each of the three-phase micro-inverters, otherwise ending the method;
    determining whether the power sum is less than 3/6 of the full power of the three-phase micro-inverters;
    if the power sum is less than 3/6 of the full power, generating a control signal to further turn off one same conversion circuit in each of the three-phase micro-inverters, otherwise ending the method;
    determining whether the power sum is less than 2/6 of the full power of the three-phase micro-inverters;
    if the power sum is less than 2/6 of the full power, generating a control signal to further turn off one same conversion circuit in each of the three-phase micro-inverters, otherwise ending the method;
    determining whether the power sum is less than 1/6 of the full power of the three-phase micro-inverters; and
    if the power sum is less than 1/6 of the full power, generating a control signal to further turn off one same conversion circuit in each of the three-phase micro-inverters, otherwise ending the method.

7. The method for improving conversion efficiency of the solar photovoltaic three-phase micro-inverter system of claim 6, wherein the conversion circuits are interlaced parallel.

8. The method for improving conversion efficiency of the solar photovoltaic three-phase micro-inverter system of claim 6, wherein the three-phase micro-inverters are distributed micro-inverters.

* * * * *